US010991195B2

(12) United States Patent
Oyama et al.

(10) Patent No.: US 10,991,195 B2
(45) Date of Patent: Apr. 27, 2021

(54) INFORMATION PROCESSOR, RECORDING MEDIUM, AND GAME CONTROL METHOD

(71) Applicant: Universal Entertainment Corporation, Tokyo (JP)

(72) Inventors: Masaki Oyama, Tokyo (JP); Toshikazu Jinnouchi, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 0 days.

(21) Appl. No.: 16/588,112

(22) Filed: Sep. 30, 2019

(65) Prior Publication Data

US 2020/0111288 A1 Apr. 9, 2020

(30) Foreign Application Priority Data

Oct. 5, 2018 (JP) ............................ JP2018-190210

(51) Int. Cl.
*G06F 17/00* (2019.01)
*G07F 17/32* (2006.01)

(52) U.S. Cl.
CPC ...... *G07F 17/3211* (2013.01); *G07F 17/3209* (2013.01); *G07F 17/3216* (2013.01); *G07F 17/3244* (2013.01); *G07F 17/3262* (2013.01)

(58) Field of Classification Search
None
See application file for complete search history.

(56) References Cited

U.S. PATENT DOCUMENTS 8,282,488 B2 * 10/2012 Walker ................ G07F 17/3255 463/41
2004/0023715 A1 * 2/2004 Luciano, Jr. ........ G07F 17/3244 463/25
2008/0102916 A1 * 5/2008 Kovacs ............... G07F 17/3211 463/16
2009/0117969 A1 * 5/2009 Englman ............. G07F 17/3276 463/20
2009/0270175 A1 * 10/2009 Kelly .................. G07F 17/3267 463/42
2010/0120503 A1 * 5/2010 Hoffman ............. G07F 17/3209 463/20
2011/0034240 A1 * 2/2011 Naicker .................. G07F 17/32 463/27
2012/0184353 A1 * 7/2012 Anderson ............... G07F 17/32 463/25
2013/0210512 A1 * 8/2013 Meyer ................. G07F 17/3269 463/16
2014/0121000 A1 * 5/2014 Porter ..................... G07F 17/34 463/20
2016/0110943 A1 * 4/2016 Nicely ................ G07F 17/3269 463/20

* cited by examiner

*Primary Examiner* — Paul A D'Agostino
(74) *Attorney, Agent, or Firm* — Simpson & Simpson, PLLC; S. Peter Konzel

(57) ABSTRACT

An information processor displays a slot game on a display and stores the detail of a bet in a flash memory in accordance with an input indicating the bet. When the slot game is finished, the information processor determines whether an item for automation is valid. When the item for automation is valid, the information processor starts the next execution of the slot game with the detail of the bet stored in the flash memory. When the item for automation is not valid, the information processor waits for an input of a bet on the next execution of the slot game.

8 Claims, 9 Drawing Sheets

FIG.5

AUTOMATION TABLE

| PROCESS | NORMAL SPEED MODE | FIRST SPEED MODE | SECOND SPEED MODE |
|---|---|---|---|
| NORMAL GAME AUTOMATIC SPIN | OFF | ON | ON |
| BONUS GAME AUTOMATIC START | OFF | OFF | ON |
| FREE GAME AUTOMATIC SPIN | OFF | ON | ON |
| AUTOMATIC ITEM USE | — | ON | ON |

INFORMATION PROCESSOR, RECORDING MEDIUM, AND GAME CONTROL METHOD

CROSS-REFERENCE TO RELATED APPLICATION

This application is entitled to the benefit of Japanese Patent Application No. 2018-190210 filed on Oct. 5, 2018.

FIELD OF THE INVENTION

The present invention relates to an information processor, a recording medium, and a game control method.

BACKGROUND OF THE INVENTION

There are slot games in which rotation of reels start and stop in order so that a game result is presented (e.g., Japanese Laid-Open Patent Publication No. 2013-153870). In such slot games, after an input of a bet by a user, the bet is confirmed by a start input and the game starts. The slot game is typically in a standby state for waiting for an input of a bet on the next execution of the game, after the output of a game result.

Methods for eliminating a standby state in a game are recited in Japanese Laid-Open Patent Publication No. 2016-154707 and Japanese Laid-Open Patent Publication No. 2014-217766. Japanese Laid-Open Patent Publication No. 2016-154707 discloses that whether to use an auto-play item is selected at the start of a game, and a character which is supposed to be controlled by a player is automatically controlled when the auto-play item is used. Japanese Laid-Open Patent Publication No. 2014-217766 discloses that there is a recovery item for recovering a consumption parameter used for fighting with an enemy character, and plural fights are finished at once when plural recovery items corresponding to plural fights with the enemy character are consumed.

BRIEF SUMMARY OF THE INVENTION

There is a certain percentage of users of the slot game who wish to increase the number of game play per unit time by accelerating game progress, and such users would wish to eliminate the standby state before the start of the next execution of the game. In Japanese Laid-Open Patent Publication No. 2016-154707, the next execution of the game is automatically done, but the time until the next execution starts is long because whether to use the auto-play item is selected until the start of the next execution. In Japanese Laid-Open Patent Publication No. 2014-217766, execution of the game plural times is completely omitted and another game is executed once. However, because a game result of each execution of the slot game is important for users, replacing the execution of the game plural times with the execution of another game once is problematic. Furthermore, because in the slot game the execution of a free game more than once is typically awarded depending on a game result, it is difficult to apply the technology of Japanese Laid-Open Patent Publication No. 2014-217766 to the slot game, in consideration of the rules.

An object of the present invention is to provide an information processor, a recording medium, and a game control method, by which a game advances more quickly than usual.

An information processor of the present invention includes:

a display configured to display a slot game;

a memory;

an input device configured to receive an input; and a controller, the controller being programmed to execute the processes of:

storing detail of a bet in the memory in accordance with an input indicating the bet;

when the slot game is finished, determining whether a predetermined condition is satisfied;

when the predetermined condition is satisfied, starting next execution of the slot game with the detail of the bet stored in the memory; and when the predetermined condition is not satisfied, waiting for an input of a bet on next execution of the slot game.

According to the arrangement above, when the predetermined condition is satisfied, after the execution of the slot game is finished, the next execution of the slot game automatically starts. Because the time for executing the slot game once is shortened by the time for the standby state after the slot game is finished, the game progresses more quickly than usual.

The information processor of the present invention may be adapted so that, when an item usable in the slot game is used by a user, the controller validates the item for a predetermined time, and specifies that the predetermined condition is validity of the item.

According to the arrangement above, when the item is used by the user, the next execution of the slot game automatically starts during a predetermined time. This allows the user to determine whether to automatically continue the slot game for a predetermined time.

The information processor of the present invention may be adapted so that, the controller automatically maintains the item to be valid after the predetermined time elapses from the use of the item, on condition that the item is used again.

According to the arrangement above, the state with the validated item is automatically continued even after the predetermined time elapses on condition that the item is used again. As a result, there is less burden on the user to interrupt the game play and use the item again in order to continue the state with the validated item.

A recording medium of the present invention is a non-transitory computer readable recording medium storing a game program, the game program causing a computer including a display, a memory, and an input device to execute the processes of:

displaying a slot game on the display;

receiving an input to the input device;

storing detail of a bet in the memory in accordance with an input indicating the bet;

when the slot game is finished, determining whether a predetermined condition is satisfied;

when the predetermined condition is satisfied, starting next execution of the slot game with the detail of the bet stored in the memory; and when the predetermined condition is not satisfied, waiting for an input of a bet on next execution of the slot game.

According to the arrangement above, when the predetermined condition is satisfied, after the execution of the slot game is finished, the next execution of the slot game automatically starts. Because the time for executing the slot game once is shortened by the time for the standby state after the slot game is finished, the game progresses more quickly than usual.

A game control method of the present invention is a game control method executed by a computer including a display configured to display a slot game, a memory, and an input device configured to receive an input, the method comprising the steps of: storing detail of a bet in the memory in accordance with an input indicating the bet;

when the slot game is finished, determining whether a predetermined condition is satisfied;

when the predetermined condition is satisfied, starting next execution of the slot game with the detail of the bet stored in the memory; and when the predetermined condition is not satisfied, waiting for an input of a bet on next execution of the slot game.

According to the arrangement above, when the predetermined condition is satisfied, after the execution of the slot game is finished, the next execution of the slot game automatically starts. Because the time for executing the slot game once is shortened by the time for the standby state after the slot game is finished, the game progresses more quickly than usual.

The present invention makes it possible to advance a slot game more quickly than usual.

BRIEF DESCRIPTION OF THE DRAWINGS

FIG. 5 is an explanatory diagram of an automation table.

DETAILED DESCRIPTION OF THE PREFERRED EMBODIMENT

A game system of the present invention will be described with reference to figures.

(Outline)

Figure 1:
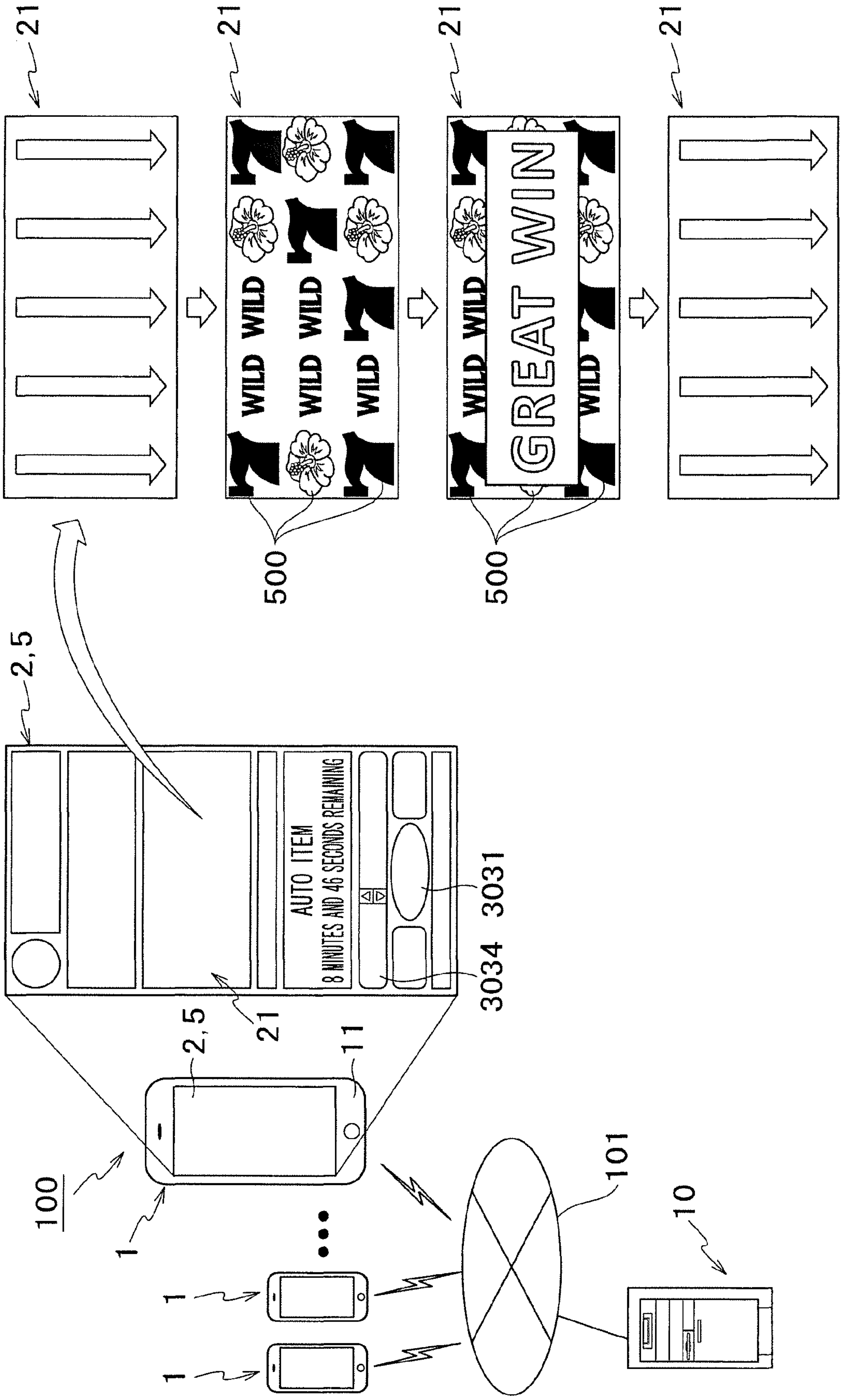
FIG. 1 illustrates the outline of an information processor.

As shown in FIG. 1, an information processor 1 is arranged such that an animation indicating a win is reproduced at high speed when a predetermined condition is satisfied.

The information processor 1 is connected to a server 10 in a data-communicable manner via the Internet 101, thereby constituting a game system 100 including the information processor 1 and the server 10. It should be noted that the game system 100 is not limited to this, and the system may be constituted only by the information processor 1. Furthermore, the information processor 1 may indicate a game system including a terminal device such as a smartphone and a server. Functions of the information processor 1 which will be described in the present embodiment may be performed by any component of the game system.

In information processors 1, shared application software is installed from an application software server or the like corresponding to the OS (Operating System) of each information processor 1. In the present embodiment, a slot game is playable as a game element of the application software installed in the information processor 1. In other words, the user is allowed to play the slot game on this application software. The slot game may be an add-in of the application software. In other words, as an additional function of the application software, the slot game may be provided by an application software server, a server 10, etc. independently from the application software. The application software may allow the player to play plural types of slot games which are different in effects or rules. The application software may be a web browser.

The slot game starts on the premise of consumption of an accumulable gaming value. When a winning is achieved as a result of the slot game, a gaming value corresponding to the type of the winning and the consumed gaming value is added to the accumulated gaming value. As such, the information processor 1 executes the slot game in which the accumulable gaming value is increased or decreased in accordance with a result. The gaming value may be information (game point) which is used exclusively for starting the slot game and does not have a monetary value or may be electronic valuable information having a monetary value. Hereinafter, a gaming value which is a start condition of the slot game and an act of setting and confirming a gaming value may be termed a bet. Furthermore, a gaming value awarded as a game result of the slot game may be termed a payout.

As shown in FIG. 1, the information processor 1 of the present embodiment is a so-called smartphone. The information processor 1 includes a display 2 provided on the front surface of a housing 11 and a touch panel 5 provided throughout the display 2. The display 2 is provided with a symbol display area 21 in which symbols are varied and stopped after the start of the game.

To be more specific, the symbol display area 21 is provided with scroll areas as display frames. In each of the scroll areas, a video reel having a symbol array on which symbols are arranged is provided. When the slot game starts, the video reel scrolls and then stops in each of the scroll areas.

Each scroll area is formed of plural cells aligned in the up-down direction. In other words, cells are provided in the symbol display area 21 to form a matrix of plural columns by plural rows. When the symbols are rearranged, a symbol is displayed in each cell. While the borders between the cells are not clearly shown in the present embodiment, frames may be displayed on the borders between the cells, for example. Three cells are provided in each scroll area. In other words, a matrix of 5 columns and 3 rows is formed in the symbol display area 21. The disclosure, however, is not limited to this arrangement.

As described above, on the display 2, a play image of the slot game in which a video reel having a symbol array with symbols is scrolled and then stopped so that one or more of the symbols is rearranged is displayed in each of the five scroll areas in the symbol display area 21. On the display 2, furthermore, a play image in which a game result of the slot game is output in accordance with the arrangement of the symbols in the scroll areas is displayed.

In such a slot game, the information processor 1 internally and randomly determines symbols to be rearranged in the symbol display area 21, for each of the scroll areas in advance. In other words, the information processor 1 internally and randomly determines a game result of the slot game. Based on the random determination, the information processor 1 rearranges the symbols of the video reels in the scroll areas. As such, the information processor 1 executes a process of internally and randomly determining a game result of the slot game.

For example, on the display 2, the slot game progresses as described below. To be more specific, as shown in FIG. 1, in the information processor 1, a touch panel 5 which is an input device receives an input to a spin button 3031 displayed on the display 2. A betting amount consumed in one execution of the slot game is set by an input (betting) to a bet button 3034, and is confirmed by an input to the spin button 3031. In other words, the information processor 1 stores the detail of the betting in accordance with an input to the spin button 3031. The detail of the betting is stored in a later-described flash memory 104 (see FIG. 2). The information processor 1 then starts an effect of scrolling a symbol array in each scroll area of the symbol display area 21. The information processor 1 then stops the symbols in accordance with the symbol arrangement having been randomly determined, and displays a game result of the slot game. As such, the information processor 1 includes the display 2 on which the slot game is displayed.

In the present embodiment, as shown in FIG. 1, when, for example, an effect for a payout is finished and the execution of the slot game once is finished, the information processor 1 determines whether a predetermined condition is satisfied, and starts the next execution of the slot game with the stored detail of the betting, when the predetermined condition is satisfied. When the predetermined condition is not satisfied, the information processor 1 does not start the next execution of the slot game and waits for an input of a bet.

As such, when the predetermined condition is satisfied, after the execution of the slot game is finished, the next execution of the slot game automatically starts. Because the time for executing the slot game once is shortened by the time for the standby state after the slot game is finished, the game progresses more quickly than usual.

In the present embodiment, the predetermined condition for automatically starting the next execution of the slot game is the use of an item usable in the slot game by the user. To be more specific, when an item is used by the user, the item becomes valid for a predetermined time. When the execution of the slot game is finished during the valid time, the next execution of the slot game automatically starts.

As such, when the item is used by the user, the next execution of the slot game automatically starts during a predetermined time. This allows the user to determine whether to automatically continue the slot game for a predetermined time.

The valid time of the item may be automatically extended on condition that the item is used again. To allow the item to be used again, for example, an input object for determining whether to use the item again, such as an item continuation button, is presented when the valid time of the item draws to a close, or the item is allowed to be used again in advance by the user by using a setting screen.

As such, the state with the validated item is automatically continued even after the predetermined time elapses on condition that the item has been used again, with the result that there is less burden on the user to interrupt the game play and use the item again in order to continue the state with the validated item.

(Mechanical Structure)

As described above, the information processor 1 includes a display 2 provided on the front surface of a housing 11 and a touch panel 5 provided throughout the display 2. While the information processor 1 is a smartphone in the present embodiment, the information processor 1 may be a mobile device or a desktop device. Examples of the information processor 1 include mobile information devices such as a portable computer, a laptop computer, a tablet PC, a wearable PC, and a PDA (Personal Data Assistant).

The display 2 is configured to be able to display images. The display method of the display 2 is, for example, liquid crystal, organic electroluminescence, CRT (Cathode Ray Tube), or plasma. The touch panel 5 makes it possible to detect the coordinates of a part touched by a user's finger or the like. The touch panel 5 adopts an already known technology such as electromagnetic induction and electrostatic capacity. The information processor 1 determines an object on the screen touched by the user, or the state of the touching such as swipe and the like based on coordinates detected by the touch panel 5. The information processor 1 then makes a response according to the determination result. Hereinafter, determination of an object which is the target of input from the user by the information processor 1 may be referred to as user's selection of or touch input to an object.

The touch panel 5 may not be provided throughout the display 2. For example, the touch panel 5 may be provided on the back side of the housing 11, which is opposite to the display 2. Alternatively, the touch panel 5 may be provided at part of the display 2.

Further, in the present embodiment, the touch panel 5 operates as an input device, and accepts a swipe input, a touch input, and the like; however, the present embodiment is not limited to this. For example, a microphone or a camera may be adopted as an input device, and may receive the user's voice or gesture as an instruction input.

(Electrical Structure)

Figure 2:
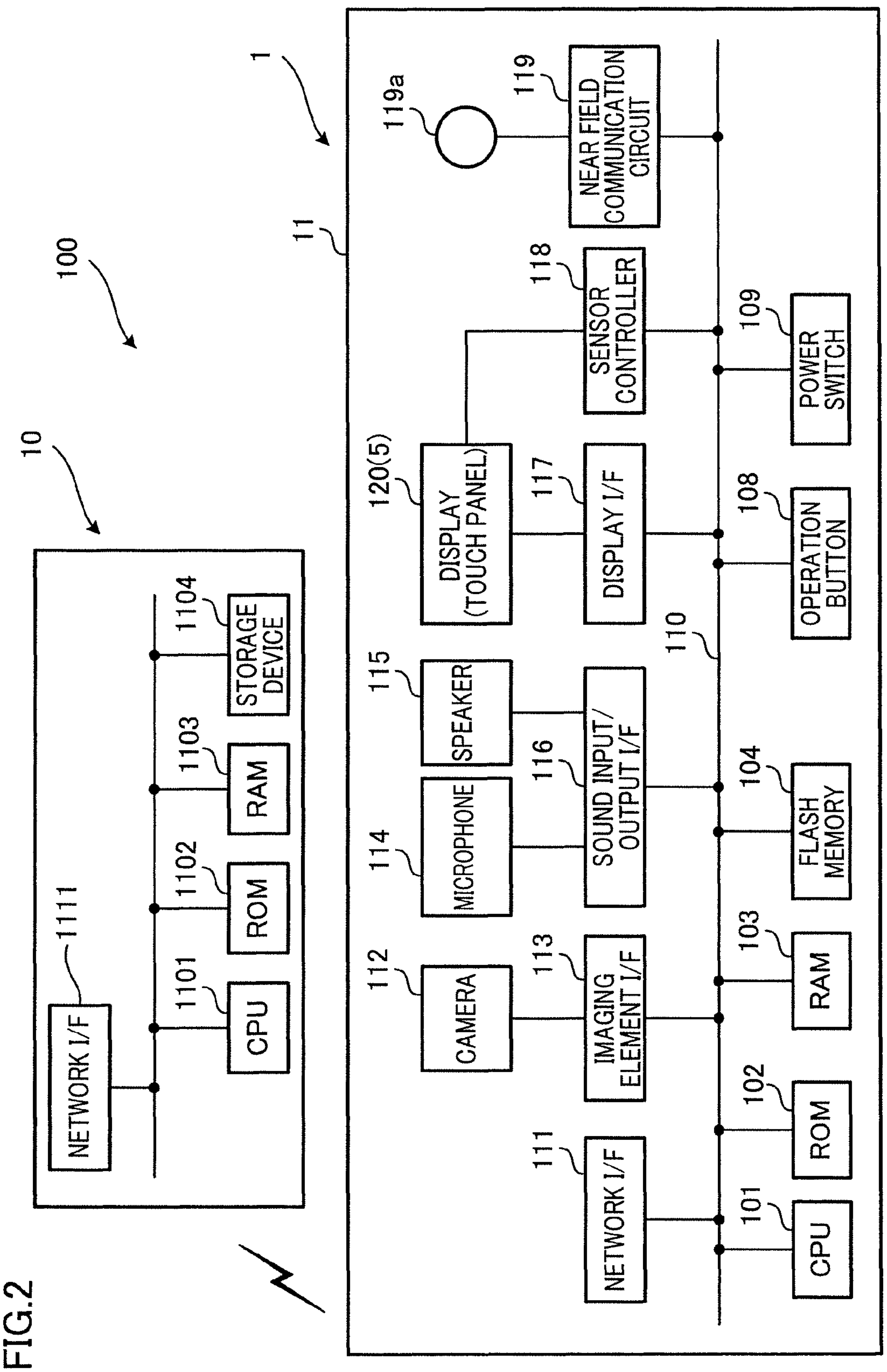
FIG. 2 is a block diagram of the electrical configuration of the information processor.

As shown in FIG. 2, the information processor 1 includes, in the housing 11, a CPU 101, a ROM 102, a RAM 103, a flash memory 104, an operation button 108, a power switch 109, a bus line 110, a network I/F 111, a camera 112, an imaging element I/F 113, a microphone 114, a speaker 115, a sound input/output I/F 116, a display I/F 117, a sensor controller 118, a near field communication circuit 119, and an antenna **119*a* of the near field communication circuit 119**.

Further, the server 10 is a so-called computer including a CPU 1101, a ROM 1102, a RAM 1103, a storage device 1104 such as a hard disk drive and the like, and a network I/F 1111.

The CPU (Central Processing Unit) 101 functions as a main structure of the controller in the information processor 1, and controls the entire operation of the information processor 1. The CPU 1101 functions as a main structure of the controller in the server 10, and controls the entire operation of the server 10. The CPUs 101 and 1101 therefore function as controllers which control the entire operation of the game system 100. The ROM (Read Only Memory) 102 stores programs used for driving the CPU 101, such as an IPL (Initial Program Loader).

The RAM (Random Access Memory) 103 and the RAM 1103 are used as a work area of the CPU 101 and the CPU 1101. The operation button 108 is used for, for example, initial setting of the information processor 1. The power switch 109 is used for turning on/off the power source of the information processor 1.

The flash memory 104 as a memory is a non-transitory computer readable medium which stores the game program, a program for communication, and plural sets of data such as image data and sound data. The storage device 1104 is a non-transitory computer readable medium which functions as a database, and stores game data of each of the information processors 1. In response to a request from the game program in the information processor 1, the server 10 returns as needed a response referring to the database in the storage device 1104.

For example, the flash memory 104 stores various programs including a game program executed by the CPU 101 as a controller and various data used in the various programs. To put it differently, the game program stored causes the information processor 1 having the CPU 101 and the flash memory 104 to execute processes of programs. For example, when the information processor 1 is equivalent to the game system 100, the flash memory 104 (storage device 1104) stores various programs including a game program executed by the CPU 101 (CPU 1101) as a controller and various data used in the various programs. To put it differently, the game program stored causes the information processor 1 (game system 100) having the CPU 101 (CPU 1101) and the flash memory 104 (storage device 1104) to execute processes of programs. As such, the processes and operations of the information processor 1 can be interpreted as those of a program or a game control method.

The data and program in the flash memory 104 and the storage device 1104 may be stored in advance at the stage of factory shipment, or may be downloaded from an unillustrated server or the like via communication means and stored. The communication means may be an interactive communication passage such as the Internet and a cable TV, or may be one-way broadcasting. Alternatively, the data and program stored in the memory flash memory 104 and the storage device 1104 may be stored in a recording medium such as a floppy disk, a CD-ROM, a DVD-ROM, an MO (optical magnetic disc), and a flash memory, and may be read from the recording medium and installed in the memory according to need.

The network I/F (Interface) 111 and the network I/F 1111 are each an interface for data communications using a communication network such as the internet. The camera 112 is a built-in camera image capturing means which captures an image of an object to obtain image data under the control of the CPU 101. The imaging element I/F 113 is a circuit for controlling the camera 112. The microphone 114 is a built-in sound collection means to which sound is input. The sound input/output I/F 116 is a circuit for processing input and output of a sound signal between the microphone 114 and the speaker 115 under the control of the CPU 101. The display I/F 117 is a circuit for sending image data to the display 2 under the control of the CPU 101. The display 2 is provided on the front surface of the housing 11. The sensor controller 118 is a circuit for receiving an input from the touch panel 5 of the display 2. The near field communication circuit 119 is a communication circuit based on NFC (Near Field Communication) (Registered Trademark). Bluetooth (Registered Trademark), or the like. The bus line 110 is an address bus, a data bus, or the like for electrically connecting the components such as the CPU 101.

(Slot Game: Definitions)

The slot game is playable by a user as a game element of the installed application software. The slot game is a game in which symbols are varied and then stopped in the symbol display area 21 (rearrangement) and a gaming value is awarded based on a combination of symbols displayed in the symbol display area 21. A state in which symbols are displayed after being varied and stopped in the symbol display area is termed "rearrangement". In the slot game, a bonus game advantageous for the player as compared to the normal game may be executed when the normal game is executed and a predetermined condition is satisfied in the normal game.

A gaming value is used as a substitute for credits in the game, and is used for betting as a condition to execute the slot game. That is, a user plays the slot game (unit game) once by betting a gaming value, and may acquire a gaming value as a result of the slot game.

The "unit game" is a series of operations from the start of the receiving of a bet to a state in which an award can be established. To put it differently, the unit game includes a single bet time for receiving a bet, a single game time of rearranging stopped symbols, and a single payout time of a payout process of awarding a payout.

(Slot Game: Functional Blocks)

Figure 3:
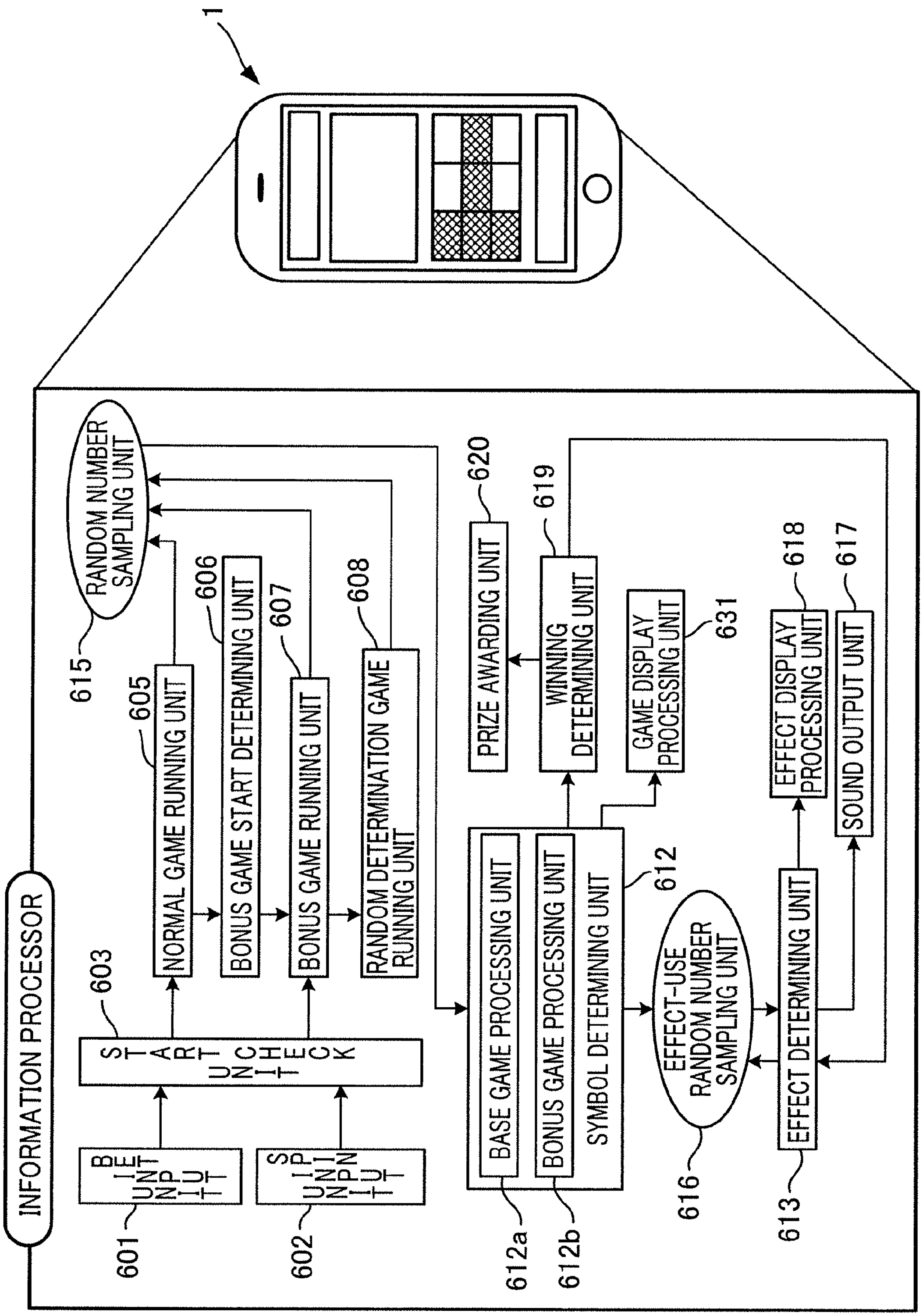
FIG. 3 is a functional block diagram of the information processor.

As shown in FIG. 3, the terminal device 1 which is a gaming machine running the slot game has the following functions. To be more specific, the terminal device 1 includes a BET input unit 601 and a spin input unit 602. The BET input unit 601 and the spin input unit 602 are kinds of input devices. The BET input unit 601 has a function of receiving a bet in response to a user operation. The spin input unit 602 has a function of receiving a user operation, i.e., an instruction to start a game.

The information processor 1 includes a start check unit 603, a normal game running unit 605, a bonus game start determining unit 606, a bonus game running unit 607, a random determination game running unit 608, a random number sampling unit 615, a symbol determining unit 612, an effect-use random number sampling unit 616, an effect determining unit 613, a sound output unit 617, an effect display processing unit 618, a winning determining unit 619, a prize awarding unit 620, and a game display processing unit 631.

The start check unit 603 has a function of storing the detail of a bet received by the BET input unit 601 and a function of starting the game with the stored detail of the bet based on an instruction to start the game received by the spin input unit 602.

The start check unit 603 further has a function of determining whether the predetermined condition is satisfied, a function of automatically starting the game without waiting for an instruction to start the game received by the spin input unit 602 when the predetermined condition is satisfied, and a function of not starting the game until an instruction to start the game is received by the spin input unit 602 when the predetermined condition is not satisfied.

The normal game running unit 605 has a function of running a normal game which is a base game, on condition that the BET input unit 601 is operated. The bonus game start determining unit 606 determines whether to run a bonus game, based on a combination of rearranged symbols resulted from the normal game. In other words, the bonus game start determining unit 606 has functions of: determining that the player is entitled to a bonus game when a bonus trigger condition is established; and activating the bonus game running unit 607 so as to run a bonus game from the subsequent unit game. The random determination game running unit 608 has a function of randomly determining prizes including the bonus game. As this function is executed after the execution by the bonus game running unit 607, the bonus game can be repeatedly run.

The symbol determining unit 612 includes a base game processing unit 612*a* and a bonus game processing unit 612*b*. The symbol determining unit 612 including these processing units 612*a* and 612*b* has functions of: determining symbols to be rearranged based on a random number given from the random number sampling unit 615; rearranging the determined symbols in the symbol display area 21 of the display 2; outputting rearrangement information of the symbols to the winning determining unit 619; and outputting an effect instruction signal to the effect-use random number sampling unit 616, based on the combination of the rearranged symbols.

The effect-use random number sampling unit 616 has functions of: when receiving the effect instruction signal from the symbol determining unit 612, extracting an effect-use random number; and outputting the effect-use random number to the effect determining unit 613. The effect content determining unit 613 has functions of: determining an effect content by using the effect-use random number; outputting image information on the determined effect content to the effect display processing unit 618; and outputting audio and illumination information of the determined effect content to the sound output unit 617.

The winning determining unit 619 has functions of: determining whether a winning is achieved based on a combination of symbols when rearrangement information of the symbols is given; calculating an amount of payout based on a winning combination formed when it is determined that a winning has been achieved; and outputting, to the prize awarding unit 620, a payout signal which is based on the payout amount. The prize awarding unit 620 has a function of paying out a gaming value to the user.

When, for example, the information processor 1 executes the indication effect based on the ratio of a payout amount to a bet amount, the winning determining unit 619 may have a function of outputting the payout amount to the effect content determining unit 619. The effect content determining unit 619 may have a function of requesting the effect-use random number sampling unit 616 to send a random number for determining the indication effect, when the ratio of the payout amount to the bet amount meets the condition of executing the indication effect. The effect content determining unit 619 may have a function of determining the indication effect based on the random number.

Though not shown, the outputted contents by each of the above processing units is suitably transmitted to the server 10 connected via a communication line.

While processes and actions are described in the present embodiment with the assumption that the information processor 1 which is a smartphone has the functions above, the functions may be distributed to the components of the game system 100. For example, random determination of a result of the slot game may be performed by the server 10.

(Slot Game: Game Contents)

As the slot game, the information processor 1 has two game modes, namely a normal game mode and a bonus game mode. The normal game mode is a game state during the normal game, whereas the bonus game mode is equivalent to a game state in the free game. The information processor 1 shifts to the bonus game mode when the unit game is run in the normal game mode and a bonus trigger condition is satisfied in the normal game mode. The trigger of the bonus game is, for example, a condition in which three or more bonus symbols appear (are rearranged). The trigger of the bonus game may be another condition.

(Slot Game: Game Contents: Normal Game Mode)

The normal game mode is specifically described. In the game area displayed on the display 2 (see FIG. 1), symbols for the slot game are rearrangeable on the video reels with 3 rows and 5 columns. In a betting process, a bet amount is selected by the user. The bet amount is, for example, selected from numbers such as 1, 2, 3, 5, and 10 by operating the bet button, or an input of a desirable number may be enabled. The resource generated by accumulating parts of bet amounts is termed jackpot.

Thereafter, in the game area, as the symbols are rearranged by varying (scroll-moving) and stopping (scroll-stop) the video reels, whether winning is achieved is determined. Then win determination is performed based on the state of the rearranged symbols. For example, a bonus game trigger is established when three or more bonus symbols are rearranged in the game area.

(Slot Game: Game Contents: Normal Game Mode: High-Probability Game and Low-Probability Game)

The slot game which is run in the normal game mode is one of two types of games, namely a high-probability game and a low-probability game. Although not illustrated, the information processor 1 uses different symbol arrays between the high-probability game and the low-probability game. In a high-probability-game video reel used in the high-probability game, the number of long symbols on the symbol array is larger than the number of long symbols on a low-probability-game video reel used in the low-probability game, in order to arrange the trigger of the bonus game to be easily established.

Each time the low-probability game is run in the normal game mode, the information processor 1 performs random determination for the shift to the high-probability game. When a win is achieved in the random determination, the information processor 1 changes the slot game executed in the normal game mode to the high-probability game. When the execution of the free game is finished in the bonus game mode, the information processor 1 sets the slot game in the subsequent normal game mode to be the high-probability game. In any case, the number of times of execution of the high-probability game is randomly determined. When the high-probability game is executed the determined number of times, the slot game thereafter is the low-probability game.

(Slot Game: Game Contents: Bonus Game Mode)

The normal game mode shifts to the bonus game mode when the trigger condition of the bonus game is established, and a free game process is executed, to begin with.

In the free game process, free game reel strips used in the free game are determined, and a predetermined number of times of execution of the free game is set. The reel strips for the free game and the number of times of execution of the free game may be randomly chosen from plural selected options.

As the free game is run, win determination is executed. This win determination may be identical with the win determination in the normal game. For example, when three or more bonus symbols appear in the game area again, a retrigger condition of the bonus game (free game) is established, and the number of times of execution of the free game is increased.

Thereafter, whether the free game ends is determined. If the remaining number of times of execution of the free game is not zero, the free game is run for the remaining number of times.

(Slot Game: Game Contents: Game Start Automation)

The game start automation in the slot game will be described with reference to FIG. 4. In the information processor 1 of the present embodiment, two type of items for automation, i.e., a speed item and a high-speed item are available for the user. Although not illustrated, each item can be used in an item use screen shifted from the slot game screen. Hereinafter, a state in which the speed item is valid is termed first speed mode. Furthermore, a state in which the high-speed item is valid is termed second speed mode. Furthermore, a state in which none of the items for game start automation is valid is termed normal speed mode.

Figure 4:
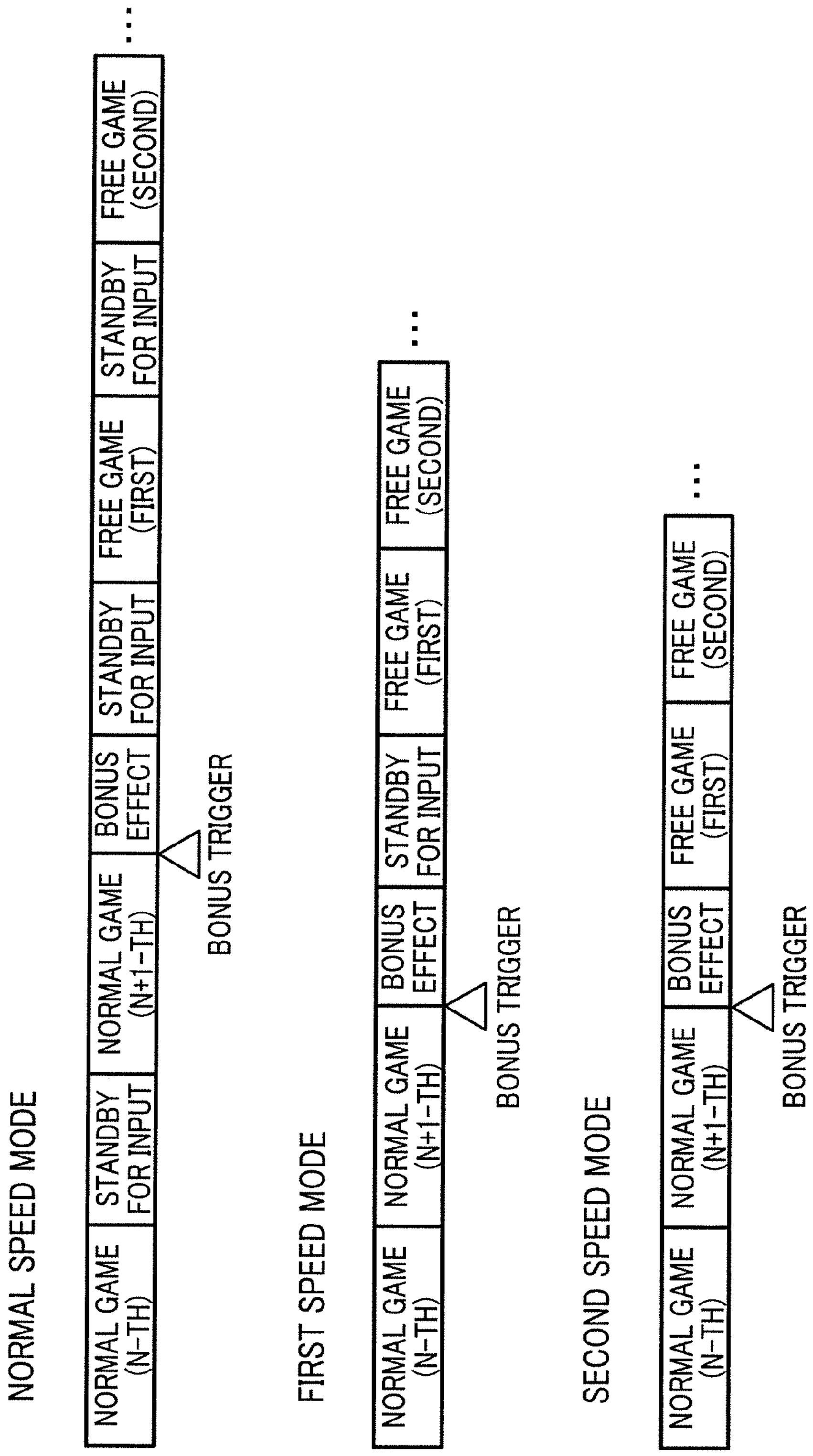
FIG. 4 shows the outline of the automation of the progress of a slot game.

FIG. 4 schematically shows a time chart which shows the progress of the slot game in each mode. As shown in FIG. 4, in the normal speed mode, there is a standby time for input between the N-th execution of the normal game and the N+1-th execution of the normal game. To put it differently, in the normal speed mode, after the N-th execution of the normal game is finished, the user is required to perform a touch input to the spin button 3031 (see FIG. 1) to start the N+1-th execution of the normal game. Meanwhile, in the first speed mode and the second speed mode, there is no standby time for an input between the N-th execution of the normal game and the N+1-th execution of the normal game. To put it differently, in the first speed mode and the second speed mode, after the N-th execution of the second speed mode is finished, the user is not required to perform a touch input to the spin button 3031 (see FIG. 1) and the N+1-th execution of the normal game automatically starts. In the free game in the bonus game, there is a standby time for an input between the executions of the free game in the normal speed mode.

When a bonus trigger is established in the normal game, a bonus effect is executed to indicate the start of the bonus game, and then the bonus game in which the free game can be executed more than once starts. In this connection, in the normal speed mode and the first speed mode, there is a standby time for an input between the bonus effect and the first execution of the free game. To put it differently, in the normal speed mode and the first speed mode, the user is required to perform a touch input to start the bonus game, in order to start the first execution of the free game after the bonus effect. Meanwhile, in the second speed mode, there is no standby time for an input between the bonus effect and the first execution of the free game. To put it differently, in the second speed mode, the user is not required to perform a touch input after the bonus effect and the first execution of the free game automatically starts.

As such, in the first speed mode in which the user has used and activated the speed item, the normal game and the free game automatically start. In the second speed mode in which the user has used and activated the high-speed item, an input before the bonus game is not required and the first execution of the free game automatically starts.

(Data Table)

The following describes a data table stored in the information processor 1. The flash memory 104 of the information processor 1 stores the automation table (see FIG. 5).

(Data Table: Automation Table)

As shown in FIG. 5, the automation table includes a process column, a normal speed mode column, a first speed mode column, and a second speed mode column. In the process column, a process to be automated is stored. In the normal speed mode column, the first speed mode column, and the second speed mode column, information indicating whether to execute each process stored in the process column is stored.

Each process stored in the process column will be specifically described. "Normal Game Automatic Spin" indicates a process of automatically starting the slot game in the normal game. "Bonus Game Automatic Start" indicates a process of automatically starting the bonus game and automatically starting the first execution of the free game, when the bonus is triggered in the normal game. "Free Game Automatic Spin" indicates a process of automatically starting the second and subsequent executions of the slot game in the bonus game. "Automatic Item Use" indicates a process set by a user. In this process, after the valid time of an item is finished, the use of the same item is automatically continued. The information processor 1 determines whether to execute these processes automatically, with reference to the automation table. It should be noted that processes which can be automated are not limited to the above.

(Operations)

The following will describe a game program executed by the CPU 101 of the information processor 1.

(Operation: Slot Game Process)

The following describes a game program in a slot game process executed by the CPU 101 of the information processor 1.

Figure 6:
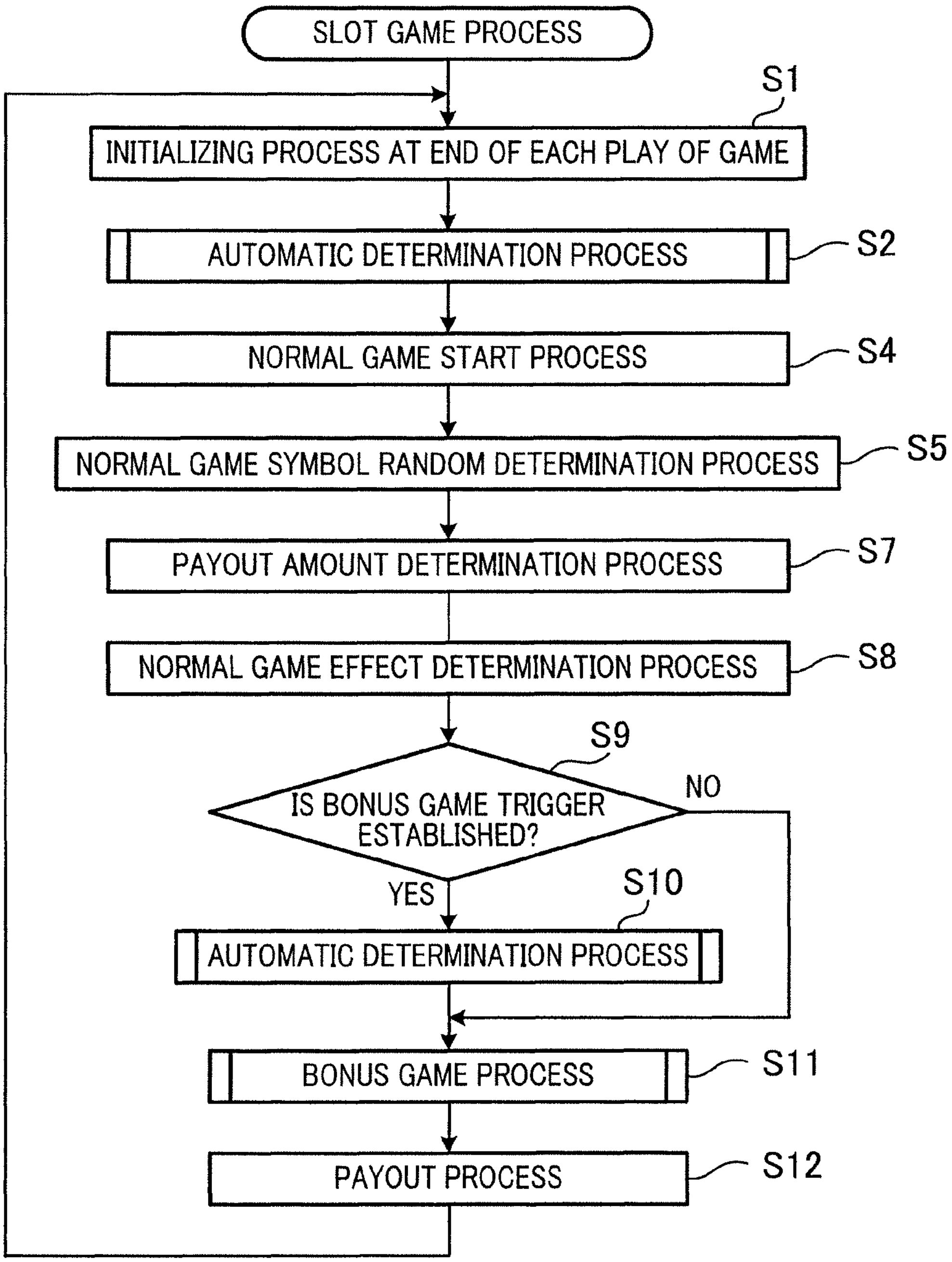
FIG. 6 is a flowchart of a slot game process.

As shown in FIG. 6, the CPU 101 executes an initializing process at the end of each play of the game (S1). For example, the CPU 101 clears data in a working area of the RAM 103, which becomes unnecessary at the end of each play of game, e.g., the bet amount and symbols selected by random determination.

The CPU 101 then executes an automation determination process (S2). This automation determination process will be described later.

The CPU 101 then executes a normal game start process (S4). In the normal game start process, the CPU 101 checks a bet amount input through the touch panel 5, for example. The CPU 101 then executes a normal game symbol random determination process (S5). In this process, the CPU 101 randomly selects and determines symbols 500 to be stopped based on a random number, with reference to a symbol array table for the video reels.

Subsequently, the CPU 101 executes a payout amount determination process (S6). To be more specific, the CPU 101 determines whether a winning combination is established on a selected payline and a win is achieved, and determines a payout amount for each of all wins regarding the payline, when a win is achieved. The CPU 101 further determines whether the bonus game is triggered.

Subsequently, the CPU 101 executes a normal game effect determination process (S7). Subsequently, the CPU 101 executes a normal game effect execution process (S8). In this process, based on the indication effect determined in the step S5 and the step S6, the CPU 101 performs control such as displaying the effect on the display 2 and outputting sound from the speaker 115.

Subsequently, based on the result of the step S4, the CPU 101 determines whether the bonus game trigger is established (S9). When the bonus game trigger is established (YES in S9), the CPU 101 executes the automation determination process in the same manner as in the step S2 (S10) and executes a bonus game process (S10).

Meanwhile, when the bonus game trigger is not established (NO in S9) or after the bonus game process in the step S10, the CPU 101 executes a payout process (S11). To be more specific, the CPU 101 adds a value stored in the payout amount storage area to a value stored in a credit amount storage area (credit counter) provided in the RAM 103. Then the CPU 101 executes the steps again from S1.

(Bonus Game Process)

Figure 7:
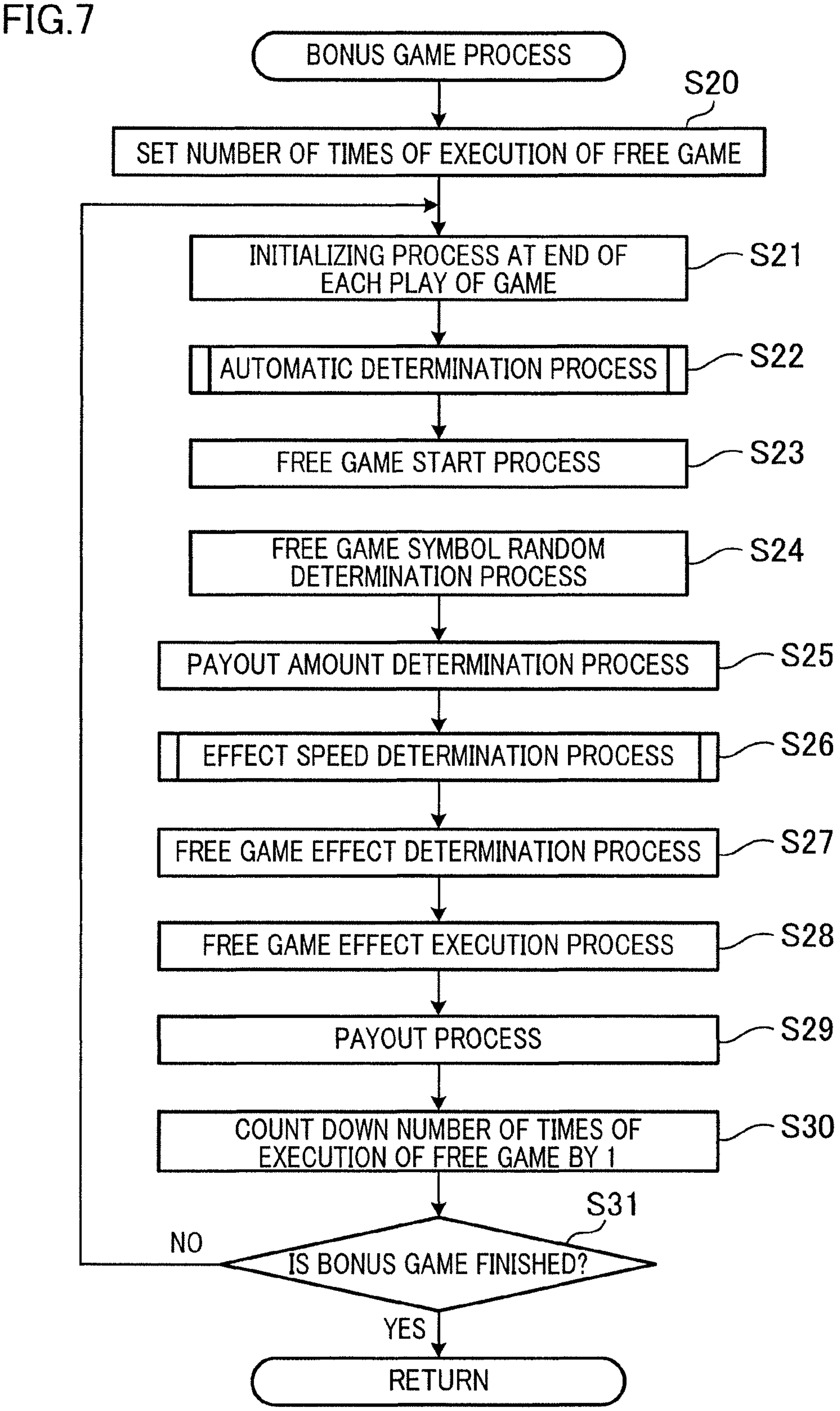
FIG. 7 is a flowchart of a bonus game process.

With reference to FIG. 7, the following describes the game program in relation to the bonus game process which is a sub routine of the slot game process executed by the CPU 101 of the information processor 1.

To begin with, the CPU 101 sets the number of times of execution of the free game (S21). For example, the CPU 101 sets the number of times of execution of the free game at 5. Thereafter, the CPU 101 executes an initializing process at the end of each play of the game (S22). For example, the CPU 101 clears data in a working area of the RAM 103, which becomes unnecessary at the end of each play of game, e.g., symbols selected by random determination. It is noted that the bet amount in the bonus game is identical with the bet amount in the normal game immediately before the shift to the bonus game.

Thereafter, in the same manner as in the normal game, the CPU 101 executes a free game start process (S23), a free game symbol random determination process (S24), a payout amount determination process (S25), an effect speed determination process (S25), a free game effect determination process (S27), a free game effect execution process (S28), and a payout process (S29).

In the free game, a symbol random determination table for the free game, which is different from the symbol array table for the first video reel and the symbol array table for the second video reel used in the normal game, may be used. The symbol random determination table for the free game is preferably more advantageous than the tables used in the normal game. For example, in the symbol array table for the first video reel in the free game, the percentage of symbols related to a winning combination with a large payout amount is high (or the probabilities of stop of such symbols are high), the number of wild symbols is large (or the probabilities of stop of such symbols are high), or the number of bonus symbols is large (or the probabilities of stop of such symbols are high). In the symbol column table for the second video reel in the free game, for example, the number of special symbols 510 is large (or the probabilities of stop of such symbols are high) as compared to the video reel in the normal game.

Subsequently, the CPU 101 decrements the current number of times of execution of the free game by one (S29). Then the CPU 101 determines whether the bonus game has been finished (S30). When the number of times of execution of the free game is not 0 (NO in S30), the CPU 101 determines that the bonus game has not been finished, and executes the free game again from the step S22. Meanwhile, when the number of times of execution of the free game is 0 (YES in S30), the CPU 101 determines that the bonus game has been finished, and ends the sub routine and returns to the slot game process.

Although not illustrated, when the payout amount is determined in each of the slot game process and the bonus game process, the CPU 101 executes a process of sending the payout amount to the server 10 as an acquired amount.

(Automation Determination Process)

Figure 8:
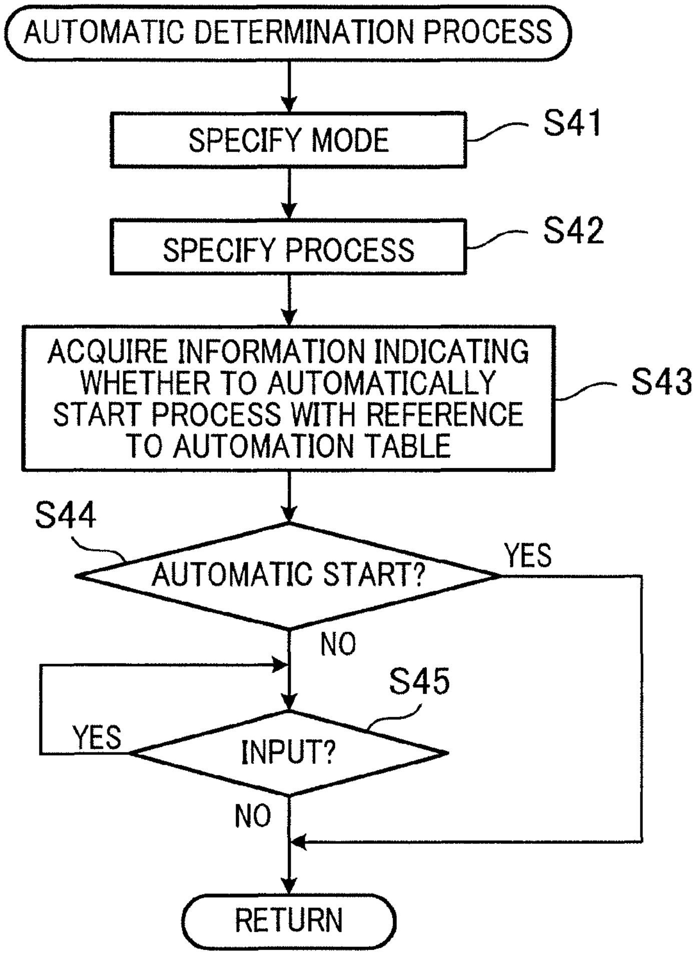
FIG. 8 is a flowchart showing an automation determination process.

With reference to FIG. 8, the following describes a game program in relation to the automation determination process which is a sub routine of the slot game process and the bonus game process executed by the CPU 101 of the information processor 1.

To begin with, the CPU 101 specifies the mode (S41). To be more specific, the CPU 101 specifies which one of the modes, namely the normal speed mode, the first speed mode, and the second speed mode, is currently set, with reference to the flash memory 104.

The CPU 101 then specifies the process (S42). To be more specific, the CPU 101 specifies for which process the determination of whether to automate or not is performed. To be more specific, the CPU 101 specifies for which one of the processes in the process column of the automation table (see FIG. 5) the determination of whether to automate or not is performed. The CPU 101 then acquires information indicating whether to automatically start the process specified in the step S42, with reference to the automation table (see FIG. 5) (S43).

The CPU 101 then determines whether to automatically start the process (S44). When the process does not automatically start (NO in S44), the CPU 101 determines whether there is an input to start the process (S45). If there is no input to start the process (NO in S45), the CPU 101 repeats the step S45 and waits for an input.

Meanwhile, when the process automatically starts in the step S44 (YES in S44) or when there is an input to start the process in the step S45 (YES in S45), the CPU 101 ends the sub routine, returns to the slot game process in which the routine was called or to the step of the bonus game process, and proceeds to the step next to that step.

(Automation Item Management Process)

Figure 9:
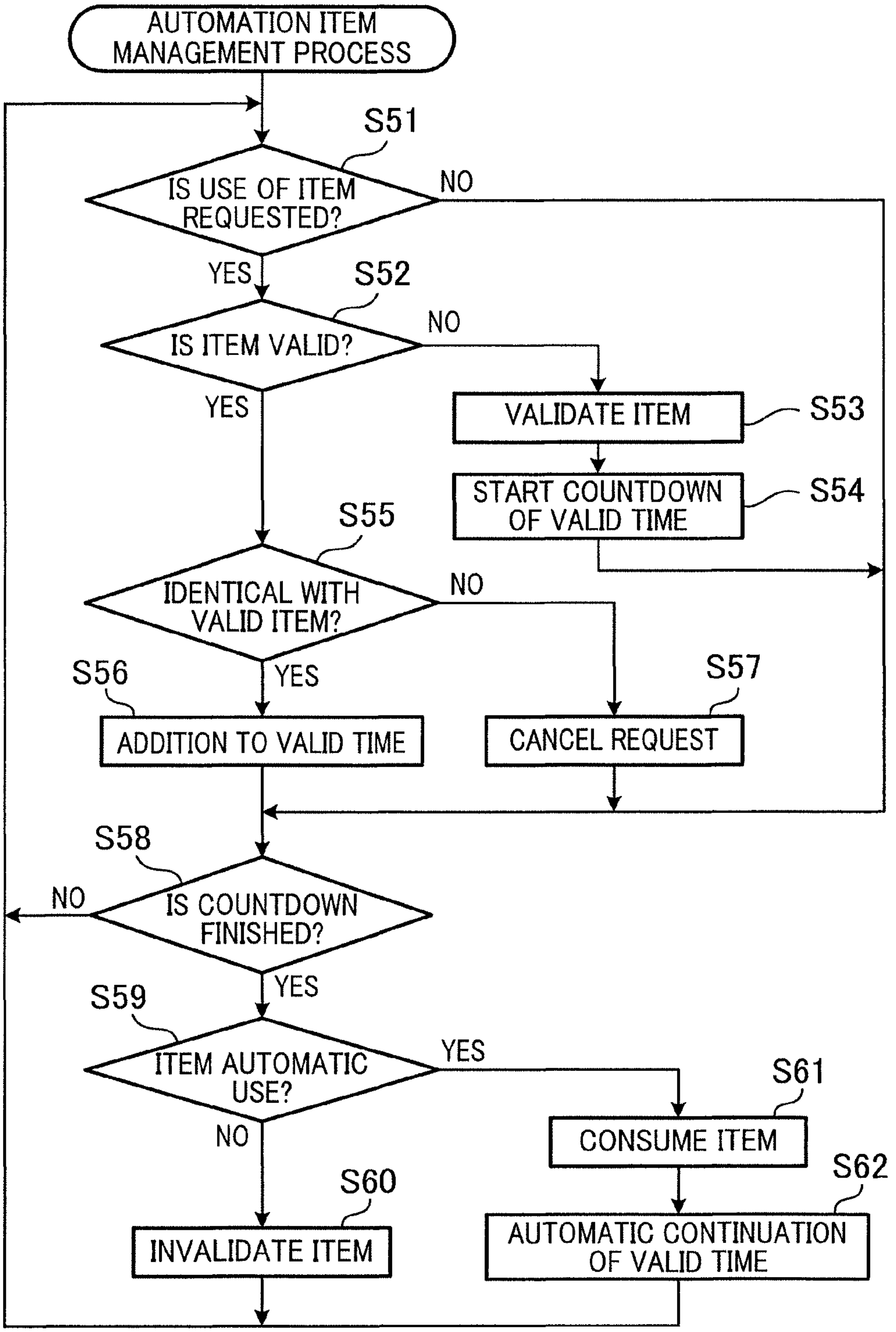
FIG. 9 is a flowchart of an automation item management process.

Next, with reference to FIG. 9, the following describes the game program in relation to an automation item management process executed by the CPU 101 of the information processor 1. The automation item management process is executed independently from the slot game process (see FIG. 6).

To begin with, the CPU 101 determines whether the use of an item has been requested (S51). In other words, the CPU 101 determines whether an input indicating the use of an item has been made to the touch panel 5 by the user.

When the use of an item has been requested (YES in S51), the CPU 101 determines whether the item is currently validated (S52). When the item is not currently validated (NO in S52), the CPU 101 validates the requested item (S53) and starts to count down the valid period of the item (S54).

Meanwhile, when the item has been validated (YES in S53), whether the requested item is identical with the validated item is determined (S55). When the requested item is identical with the validated item (YES in S55), the CPU 101 adds the valid time set in the item to be used to the valid time being counted down (S56). When the requested item is not identical with the validated item (NO in S55), the request to use the item is refused (S57).

When the use of an item is not requested in the step S51 (NO in S51) or after the step S54, S56, or S57, the CPU 101 determines whether the countdown of the valid time has been finished (S58). When the countdown has not been finished (NO in S58), the CPU 101 proceeds to the step S51. When the countdown has been finished (YES in S58), the CPU 101 determines whether the automatic item use is turned "ON", with reference to the automation table (see FIG. 5) (S59).

When the automatic item use is not turned "ON" (NO in S59), the CPU 101 invalidates the item (S60) and proceeds to the step S51. Meanwhile, when the automatic item use is turned "ON" (YES in S59), the CPU 101 consumes the item (S61) and automatically continues the valid time of the item (S62), and proceeds to the step S51. Although not illustrated, the CPU 101 causes the display 2 to always display the countdown.

Embodiments of the present invention thus described above solely serve as specific examples of the present invention, and are not to limit the scope of the present invention. The specific structures and the like are suitably modifiable. Further, the effects described in the embodiments of the present invention described in the above embodiment are no more than examples of preferable effects brought about by the present invention, and the effects of the present invention are not limited to those described hereinabove.

Further, the detailed description above is mainly focused on characteristics of the present invention to for the sake of easier understanding. The present invention is not limited to the above embodiments, and is applicable to diversity of other embodiments. Further, the terms and phraseology used in the present specification are adopted solely to provide specific illustration of the present invention, and in no case should the scope of the present invention be limited by such terms and phraseology. Further, it will be obvious for those skilled in the art that the other structures, systems, methods or the like are possible, within the spirit of the present invention described in this specification. The description of claims therefore shall encompass structures equivalent to the present invention, unless otherwise such structures are regarded as to depart from the spirit and scope of the present invention. Further, the abstract is provided to allow, through a simple investigation, quick analysis of the technical features and essences of the present invention by an intellectual property office, a general public institution, or one skilled in the art who is not fully familiarized with patent and legal or professional terminology. It is therefore not an intention of the abstract to limit the scope of the present invention which shall be construed on the basis of the description of the claims. To fully understand the object and effects of the present invention, it is strongly encouraged to sufficiently refer to disclosures of documents already made available.

The detailed description of the present invention provided hereinabove includes a process executed on a computer. The above descriptions and expressions are provided to allow the one skilled in the art to most efficiently understand the present invention. A process performed in or by respective steps yielding one result or blocks with a predetermined processing function described in the present specification shall be understood as a process with no self-contradiction. Further, the electrical or magnetic signal is transmitted/received and written in the respective steps or blocks. It should be noted that such a signal is expressed in the form of bit, value, symbol, text, terms, number, or the like solely for the sake of convenience. Although the present specification occasionally personifies the processes carried out in the steps or blocks, these processes are essentially executed by various devices. Further, the other structures necessary for the steps or blocks are obvious from the above descriptions.

What is claimed is:

1. An information processor comprising:
- a display configured to display a slot game;
- a memory;
- an input device configured to receive an input; and
- a controller, the controller being programmed to execute the processes of:
  - storing detail of a bet in the memory in accordance with an input indicating the bet;
  - executing the slot game;
  - when the slot game is finished, determining whether an item continuation input that is valid for a predetermined time has been previously received;
  - when the item continuation input has been previously received, determining whether the predetermined time remains valid;
  - when the predetermined time remains valid, automatically starting a next execution of the slot game with the detail of the bet stored in the memory; and
  - when the item continuation input has not been received, waiting for a subsequent input of a bet on a next execution of the slot game,
- wherein when the item continuation input has been received, removing a standby time period between a first execution of the slot game and a second execution of the slot game.

2. The information processor according to claim 1, wherein, the item continuation input is received via an item continuation button displayed to the display prior to the termination of the predetermined time.

3. A non-transitory computer readable recording medium storing a game program, the game program causing a computer including a display, a memory, and an input device to execute the processes of:
- displaying a slot game on the display;
- receiving an input to the input device;
- storing detail of a bet in the memory in accordance with an input indicating the bet;
- executing a slot game;
- when the slot game is finished, determining whether an item continuation input that is valid for a predetermined time has been previously received;
- when the item continuation input has been previously received, determining whether the predetermined time remains valid;
- when the predetermined time remains valid, starting a next execution of the slot game with the detail of the bet stored in the memory; and
- when the item continuation input has not been received, waiting for a subsequent input of a bet on a next execution of the slot game,
- wherein when the item continuation input has been received, removing a standby time period between a first execution of the slot game and a second execution of the slot game.

4. A game control method executed by a computer including a display configured to display a slot game, a memory, and an input device configured to receive an input, the method comprising the steps of:
- storing detail of a bet in the memory in accordance with an input indicating the bet;
- executing a slot game;
- when the slot game is finished, determining whether an item continuation input that is valid for a predetermined time has been previously received;
- when the item continuation input has been previously received, determining whether the predetermined time remains valid;
- when the predetermined time remains valid, starting a next execution of the slot game with the detail of the bet stored in the memory; and
- when the item continuation input has not been received, waiting for a subsequent input of a bet on a next execution of the slot game,
- wherein when the item continuation input has been received, removing a standby time period between a first execution of the slot game and a second execution of the slot game.

5. A game control method executed by a computer including a display on which a slot game is displayed and a memory configured to store a normal effect and a high-speed effect in which the normal effect is reproduced at higher speed than the normal effect, in association with a game result, the method comprising the steps of:
- internally and randomly determining a game result of the slot game;
- when an item continuation input that is valid for a predetermined time has not been previously received, selecting the normal effect associated with the game result and displaying the normal effect on the display; and
- when the item continuation input that is valid for a predetermined time has been previously received, selecting the high-speed effect associated with the game result and displaying the high-speed effect on the display.

6. The information processor according to claim 1, wherein the slot game comprises a plurality of speed modes including at least a normal speed mode, a fast speed mode and a high speed mode; wherein, in the normal speed mode a standby time period is present between at least a pair of consecutive normal slot games and a pair of consecutive free games;

in the fast speed mode a standby time period is present between a bonus effect and a free game, and the standby time periods between at least the pair of consecutive normal slot games and the pair of consecutive free games in the normal mode are removed; and, in the high speed mode, the standby time periods between at least the pair of consecutive normal slot games and the pair of consecutive free games in the normal mode are removed, and the standby time period present between a bonus effect and a free game in the fast speed mode are removed.

7. The information processor according to claim 6, wherein each of the fast speed mode and high speed mode are selectably input by a user.

8. The information processor according to claim 1 comprising a mobile communications device including a touchscreen display, wherein the item continuation input is input via a virtual input button displayed to the touchscreen display.

* * * * *